(12) United States Patent
Iiyama et al.

(10) Patent No.: US 6,234,123 B1
(45) Date of Patent: May 22, 2001

(54) FOUR-CYCLE INTERNAL COMBUSTION ENGINE AND VALVE TIMING CONTROL METHOD THEREOF

(75) Inventors: Akihiro Iiyama; Tsuyoshi Masuda, both of Kanagawa-ken (JP); Toru Noda, Madison, WI (US)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/377,718

(22) Filed: Aug. 20, 1999

(30) Foreign Application Priority Data

Aug. 21, 1998 (JP) .................................................. 10-235730

(51) Int. Cl.[7] ........................................................ F01L 1/34
(52) U.S. Cl. .................................... 123/90.15; 123/90.16; 123/90.17
(58) Field of Search ............................. 123/90.1, 90.15, 123/90.16, 90.17, 90.18; 60/273, 274

(56) References Cited

U.S. PATENT DOCUMENTS

| | | | |
|---|---|---|---|
| 3,507,261 | * | 4/1970 | Myers et al. .......................... 60/274 |
| 3,877,222 | * | 4/1975 | Scherenberg ......................... 60/274 |
| 3,953,969 | * | 5/1976 | Mori et al. .......................... 123/90.1 |
| 4,117,813 | * | 10/1978 | Yamashita et al. ................. 123/90.15 |
| 5,293,741 | * | 3/1994 | Kashiyama et al. ............... 123/90.15 |
| 5,398,502 | * | 3/1995 | Watanabe ........................... 123/90.15 |
| 5,429,079 | * | 7/1995 | Murata et al. ..................... 123/90.16 |
| 5,626,109 | * | 5/1997 | Yasumura et al. ................. 123/90.15 |
| 5,850,811 | * | 12/1998 | Tomisawa et al. ................ 123/90.15 |
| 5,930,992 | * | 8/1999 | Esch et al. ............................. 60/274 |

FOREIGN PATENT DOCUMENTS 5-321702   12/1993   (JP) .
7-332141   12/1995   (JP) .

* cited by examiner

*Primary Examiner*—Teresa Walberg
*Assistant Examiner*—Fadi H. Dahbour
(74) *Attorney, Agent, or Firm*—Foley & Lardner

(57) ABSTRACT

In a disclosed four-cycle internal combustion engine and a method of controlling valve timing according to the present invention, a load put on the four-cycle internal combustion engine is detected, and a judgment is made as to whether or not the load of the four-cycle internal combustion engine is low, and when the judgment is made that the load of the four-cycle internal combustion engine is low, valve timing of an exhaust valve of the four-cycle internal combustion engine is set so that valve closing time of the exhaust valve advances before a top dead center of a piston of the four-cycle internal combustion engine.

13 Claims, 10 Drawing Sheets

FOUR-CYCLE INTERNAL COMBUSTION ENGINE AND VALVE TIMING CONTROL METHOD THEREOF

BACKGROUND OF THE INVENTION

The present invention relates to a four-cycle internal combustion engine and a valve timing control method thereof, and more specifically relates to those which can be used preferably for an automobile gasoline engine.

Japanese Patent Application Laid-Open No. 7-332141 discloses a compression ignition gasoline engine in which a premixed gas is compression-ignited and burned so that lean combustion and low-NOx exhaustion are attempted.

Japanese Patent Application Laid-Open No. 5-321702 discloses a valve control apparatus of an internal combustion engine in which valve timing of inlet/exhaust valves is controlled in a low engine speed area and a gas is allowed to remain in a cylinder so that exhaust efficiency and fuel consumption are improved.

SUMMARY OF THE INVENTION

According to the studies by the present inventors, in order to improve thermal efficiency of a four-cycle internal combustion engine, a fuel-air mixture is made to be lean so that a pump loss is reduced, and a ratio of specific heat of the fuel-air mixture is set to be large so that a theoretical thermal efficiency is improved.

However, in a gasoline engine, since the combustion due to spark ignition and flame propagation becomes unstable, to be lean in the fuel-air mixture is limited naturally. Moreover, at the time of the lean combustion, a catalyst for purifying an exhaust gas has a tendency to be incapable of performing a purifying function, particularly a NOx reducing function, as much as the time of combustion in stoichiometry.

Meanwhile, in a diesel engine, the extremely lean combustion can be executed, but its soot is occasionally exhausted, and a catalyst for purifying an exhaust gas can not be activated effectively.

Further, particularly in the gasoline engine, when the combustion is executed by the compression-ignition, the lean combustion and low NOx exhaustion can be intended, but the phenomenon of the compression-ignition using a premixed gas is greatly influenced by its air fuel ratio. Namely, knocking tends to occur on the rich side in its lean area, and misfire tends to occur on the lean side in its lean area, and thus an air fuel ratio range where the satisfactory operation of the engine is possible is limited inevitably. In other words, a load range where the satisfactory operation is possible tends to be limited.

In addition, even if the low NOx exhaustion is realized by the combustion of the compression ignition using the premixed gas, since EGR is not executed, substantially whole the premixed gas is exhausted as the exhaust gas, and thus such a constitution provides room to be improved in the point that the thermal efficiency is improved by efficiently utilizing its fuel.

In addition, in a case where valve timing of inlet and exhaust valves is controlled suitably in the low engine speed area and a burned gas is allowed to remain in the cylinder so that the exhaust efficiency and fuel consumption are improved, knocking tends to occur and its combustion tends to become unstable. As a result, the load range where the operation is sufficiently possible is limited.

The present invention has been achieved with such points in view, and it therefore is an object of the present invention to realize uniform premixture compression-ignited combustion, which exhibits high thermal efficiency and low NOx exhaust in a wide load range of a four-cycle internal combustion engine, and improved thermal efficiency by effectively utilizing a fuel by means of re-combustion of unburned HC in the four-cycle internal combustion engine, and therefore to attain the four-cycle internal combustion engine with high thermal efficiency and clean exhaust.

Namely, the present invention has a constitution such that valve timing of the inlet and exhaust valves is switched correspondingly when high load and low load are put on the internal combustion engine, and the valve timing is controlled variably according to the load at the time of low load, and a large quantity of residual gas in a cylinder is utilized effectively as a heat source.

More concretely, a four-cycle internal combustion engine of the present invention includes: a combustion chamber; an igniter igniting a fuel-air mixture in the combustion chamber; a piston changing a capacity of the combustion chamber; an inlet valve opening/closing the combustion chamber; an exhaust valve opening/closing the combustion chamber; an adjustable valve mechanism switching valve timing of the inlet valve and switching that of the exhaust valve; and a controller controlling the igniter and the adjustable valve mechanism. Here when a high load is put on the four-cycle internal combustion engine, the controller sets the valve timing of the exhaust valve in the adjustable valve mechanism so that the exhaust valve is closed around a top dead center of the piston, and ignites the fuel-air mixture around a compression top dead center of the piston by using the igniter. Meanwhile when a low load is put on the four-cycle internal combustion engine, the controller sets the valve timing of the exhaust valve in the adjustable valve mechanism so that valve closing timing of the exhaust valve advances before the top dead center of the piston as a load put on the four-cycle internal combustion engine becomes lower, and compression-ignites the fuel-air mixture without using the igniter.

According to such a structure, when the low load is put on the four-cycle internal combustion engine, the valve closing time of the exhaust valve advances and the exhaust valve is closed in the middle of the exhaust process before the piston top dead center. For this reason, a burned gas of high temperature whose quantity corresponds to the cylinder capacity at this time remains in the combustion chamber so as to be capable of being used as a ignition source in the next cycle. That is, a new gas sucked in the next cycle is agitated and mixed with the residual burned gas and thus the uniform fuel-air mixture of high temperature is formed. And the uniform fuel-air mixture of high temperature is compressed so that the compression ignition of the lean fuel-air mixture can be realized around the piston top dead center.

At this time, since the fuel-air mixture is self-ignited and burned due to such high temperature/high pressure atmosphere, the ignition does not require the igniter. Meanwhile, so-called flame propagation, which is observed in conventional spark-ignited combustion, does not exist, and thus a local high-temperature portion due to the flame propagation does not exist. Further, a burned gas portion after the flame surface is passed is not compressed and does not have high temperature due to the flame propagation. Still further, since so-called internal EGR with large quantity is executed, oxygen density of the fuel-air mixture is lowered. Therefore, NOx exhaust can be suppressed to an extremely small quantity.

In addition, soot is not generated because the partial rich area does not exist in the fuel-air mixture. Further, extremely lean combustion can be realized by the compression self-ignition, and unburned HC, which is normally exhausted and disposed, can be burned and recovered effectively by a large quantity of the internal EGR. As a result, the thermal efficiency can be improved.

In particular, the advance of the valve closing time of the exhaust valve at the time of the low load is controlled according to the load, and the advance degree of the valve closing time of the exhaust valve is increased on the low load side in the low load area so that the quantity of the residual burned gas is increased. Meanwhile the advance degree of the valve closing time of the exhaust valve is reduced on the high load side in the low load area so that the quantity of the residual burned gas is reduced. As a result, in the lower load state, namely in the state that the fuel-air mixture is more lean, the temperature of the fuel-air mixture can be effectively heightened by increasing the internal EGR. For this reason, the compression self-ignited combustion can be executed securely for the lean fuel-air mixture. On the contrary, since a rise in the temperature of the fuel-air mixture is comparatively suppressed by decrease in the internal EGR on the high load side in the low load area, generation of knocking can be suppressed even for its comparatively rich fuel-air mixture.

As a result, a temperature range of the fuel-air mixture where the compression-ignited combustion can be executed can be widened, namely, in a wide load range, the premixed compression-ignited combustion which provides high thermal efficiency and low NOx exhaust can be realized.

Moreover, the valve closing time of the exhaust valve is set to around the piston top dead center similarly to a conventional four-cycle internal combustion engine at the time of the high load so that the residual gas in the cylinder is reduced, and the generation of the knocking is suppressed in the conventional combustion due to the spark ignition and flame propagation by means of the igniter so that charging efficiency can be improved and high output can be obtained.

In other words, a four-cycle internal combustion engine of the present invention includes: a combustion chamber; an igniter igniting a fuel-air mixture of the combustion chamber; a piston changing capacity of the combustion chamber; an inlet valve opening/closing the combustion chamber; an exhaust valve opening/closing the combustion chamber; an adjustable valve means for switching valve timing of the inlet valve and switching that of the exhaust valve; and a controlling means for controlling the igniter and the adjustable valve means. Here, when a low load is put on the four-cycle internal combustion engine, the controlling means sets the valve timing of the exhaust valve in the adjustable valve means so that valve closing timing of the exhaust valve advances before a top dead center of the piston.

Meanwhile, a method of controlling valve timing of a four-cycle internal combustion engine of the present invention comprises the steps of: detecting a load put on the four-cycle internal combustion engine; judging as to whether or not the load put on the four-cycle internal combustion engine is low; and setting valve timing of an exhaust valve of the four-cycle internal combustion engine so that valve closing time of the exhaust valve advances before a top dead center of a piston of the four-cycle internal combustion engine, if judgment is made that the load put on the four-cycle internal combustion engine is low.

DETAILED DESCRIPTION OF THE PREFERRED EMBODIMENT

There will be detailed below preferred embodiment of the present invention with reference to the drawings.

The present embodiment will describe an example that a four-cycle internal combustion engine of the present invention is applied to a four-cycle gasoline engine (hereinafter referred to as engine).

Figure 1:
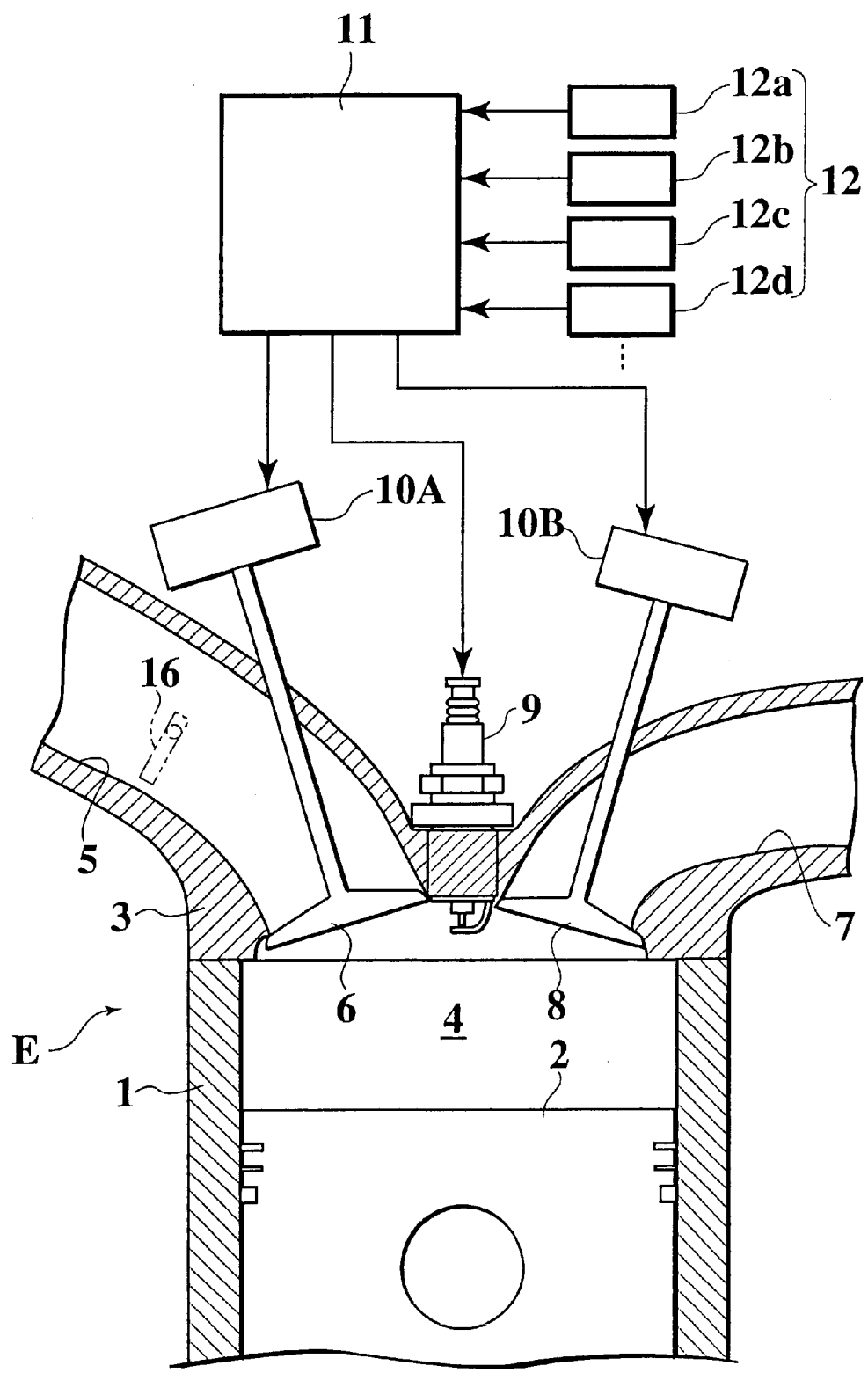
FIG. 1 is a diagram showing a structure of a four-cycle internal combustion engine according to an embodiment of the present invention.

In FIG. 1, a sign E shows an engine, a numeral 1 shows a cylinder block, a numeral 2 shows a piston and a numeral 3 shows a cylinder head. A numeral 4 shows a combustion chamber which is determined by the cylinder block 1, piston 2 and cylinder head 3.

The cylinder head 3 is provided with an inlet valve 6 for opening/closing an inlet port 5, and an exhaust valve 8 for opening/closing an exhaust port 7. An ignition plug 9 as an ignition device is provided in an approximately central position at the top portion of the combustion chamber 4.

The inlet valve 6 and the exhaust valve 7 are opened/closed independently by adjustable valve mechanisms 10A and 10B which can correspondingly change valve opening time and valve closing time of the valves 6 and 7.

The engine E is controlled by an engine control unit (hereinafter referred to as ECU) 11. The ECU 11 has a micro computer for performing an arithmetic process, a memory, necessary I/O ports and the like.

The ECU 11 is connected with sensors 12, for detecting an operating state of the engine E, such as a crank angle sensor 12a for detecting an engine speed, an accelerator pedal sensor 12b for detecting an accelerator opening, a water temperature sensor 12c for detecting a temperature of cooling water, and an airflow meter 12d for detecting an intake air quantity. The ECU 13 judges the operating state of the engine E based on signals input from the sensors 12 so as to make necessary control. Further, the ignition plug 9 and the adjustable valve mechanisms 10A and 10B are also controlled by the ECU 11.

Figure 2:
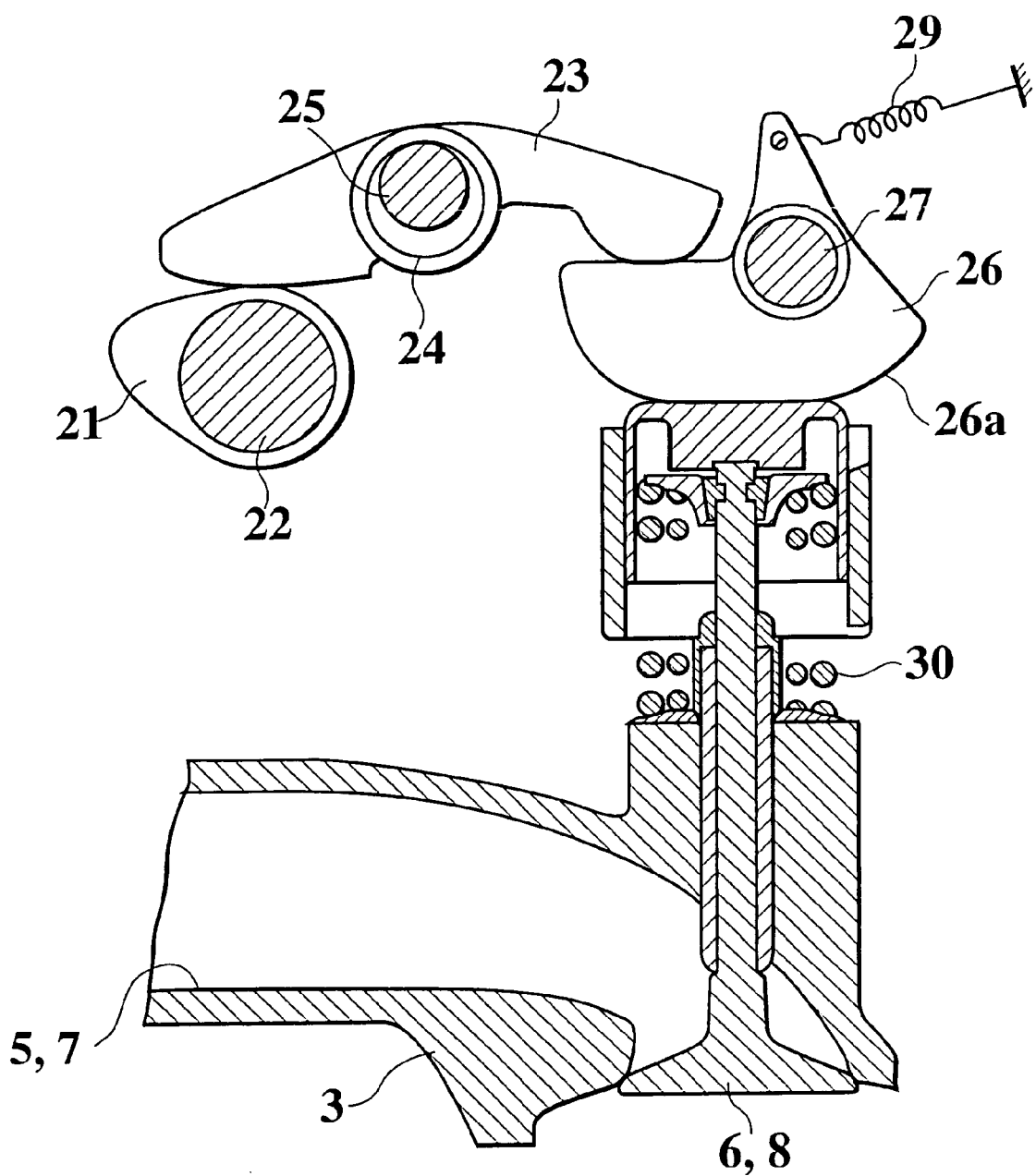
FIG. 2 is a diagram showing a structure of an adjustable valve mechanism according to the embodiment.

In the present embodiment, the adjustable valve mechanisms 10A and 10B have a structure shown in FIG. 2.

The adjustable valve mechanisms 10A and 10B respectively have a cam 21 which is supported integrally with a cam shaft 22 having a rotational axis rotating synchronously with rotation of the engine E, a rocker arm 23 which has an supporting section 24 which is eccentric to a rocker shaft 25 the rotational axis of which is parallel with the cam shaft 22 and the rocker arm 23 is supported rotatively to the rocker shaft 25 through the supporting section 24, and a swing cam 26 which is supported rotatively to a cam shaft 27 the rotational axis of which is parallel with the cam shaft 22. The swing cam 26 is urged in a clockwise direction by a spring 29, and a contact position between a cam surface 26a and the inlet valve 6 (exhaust valve 8) changes along the cam surface 26a. Here, numeral 30 shows a spring for the inlet valve 6 (exhaust valve 8).

In the adjustable valve mechanisms 10A and 10B, according to a rotation of the rocker shaft 25, a rotational axis of the rocker arm 23 changes suitably in an up-and-down direction in FIG. 2 and the rocker arm 23 transmits a change in a cam profile of the cam 21 corresponding to the rotation of the engine E to the swing cam 26. Then, the swing cam 26 moves the inlet valve 6 (exhaust valve 8) along a cam profile of the cam surface 26a correspondingly to the cam profile of the cam 21 to which the change in the rotational axis of the rocker arm 23 to the up-and-down direction was added.

FIG. 2 shows a state that the rocker arm 23 is displaced most downward with respect to the rocker shaft 25, and the case where a maximum lift quantity of the inlet valve 6 (exhaust valve 8) can be obtained. On the contrary, not shown, when the rocker arm 23 is displaced most upward with respect to the rocker shaft 25, a lift quantity of the inlet valve 6 (exhaust valve 8) becomes minimum.

More specifically, in the present embodiment, when the rocker shaft 25 is rotated suitably by the ECU 11 and the up-and-down position of the rotational axis of the rocker arm 23 is controlled, the opening/closing time and lift quantity of the inlet valve 6 (exhaust valve 8) are correspondingly controlled.

Figure 3:
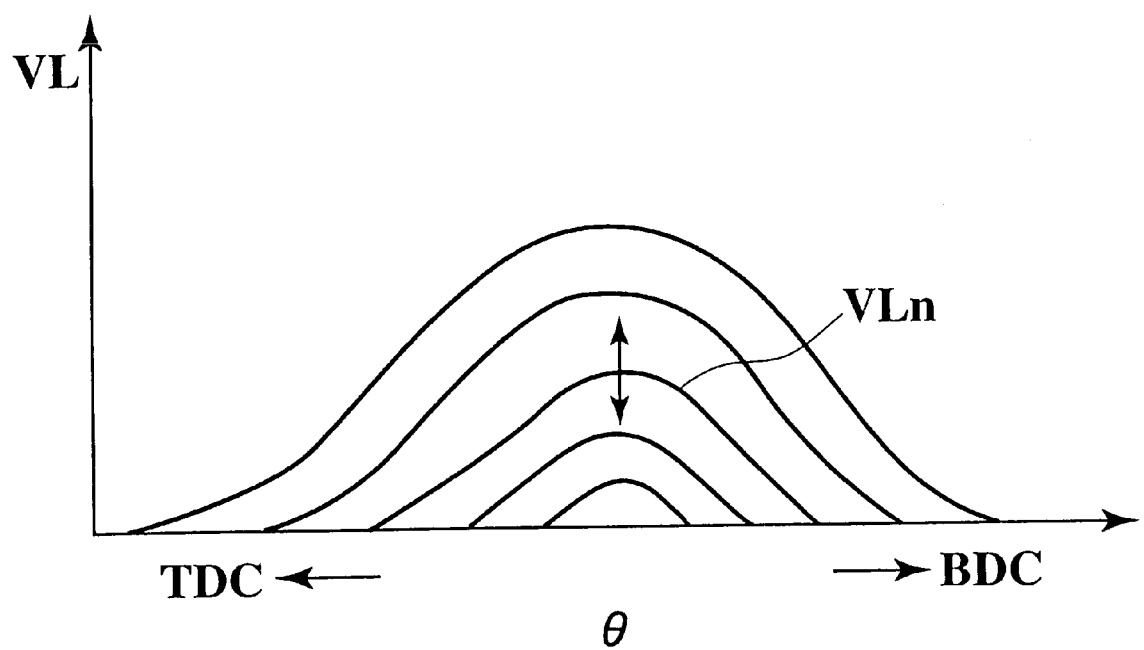
FIG. 3 is a diagram showing a change in valve lift of the adjustable valve-mechanism shown in FIG. 2.

FIG. 3 shows a relationship between a crank angle θ and valve lift quantity VL of the adjustable valve mechanisms 10A and 10B. As shown in FIG. 3, the valve lift quantity VL of the adjustable valve mechanisms 10A and 10B according to the present embodiment has a profile typically represented by an intermediate value $VL_n$. That is, it can be set to be changed sequentially in the up-and-down direction in this drawing maintaining such a smooth profile.

FIG. 4 shows a state that the valve timing of the inlet and exhaust valves 6 and 8 is changed by means of the adjustable valve mechanisms 10A and 10B at the time of high load and low load.

Here, in the present embodiment, the load of the engine E is estimated by a basic fuel injection quantity TP. As the basic injection quantity TP is larger, the load is higher, and as the basic fuel injection quantity TP is smaller, the load is lower. Here, the basic fuel injection quantity TP is calculated by the ECU 11 based on an engine speed inputted from the crank angle sensor 12a and an intake air quantity inputted from the airflow meter 12d. More concretely, the basic injection quantity TP corresponds to a pulse width of a pulse driving signal which is transmitted from the ECU 11 to an injector(not shown) for supplying a fuel into the combustion chamber 4. In the present embodiment, the pulse width of 2 through 5 (ms) has correspondence to the low-load area, and the pulse width which exceeds 5 (ms) have correspondence to the high-load area.

Needless to say, the load of the engine E can be defined suitably by using another inputs as the need arises, and for example, information such as the accelerator opening and water temperature may be added. Moreover, if a load sensor is provided to the engine E, an input from the load sensor may be directly used to define the load of the engine E.

There will be described below the valve timing of the engine E according to the present embodiment. Here, as for the valve timing, the crank angle θ of the engine E is used as a reference.

Figure 4A:
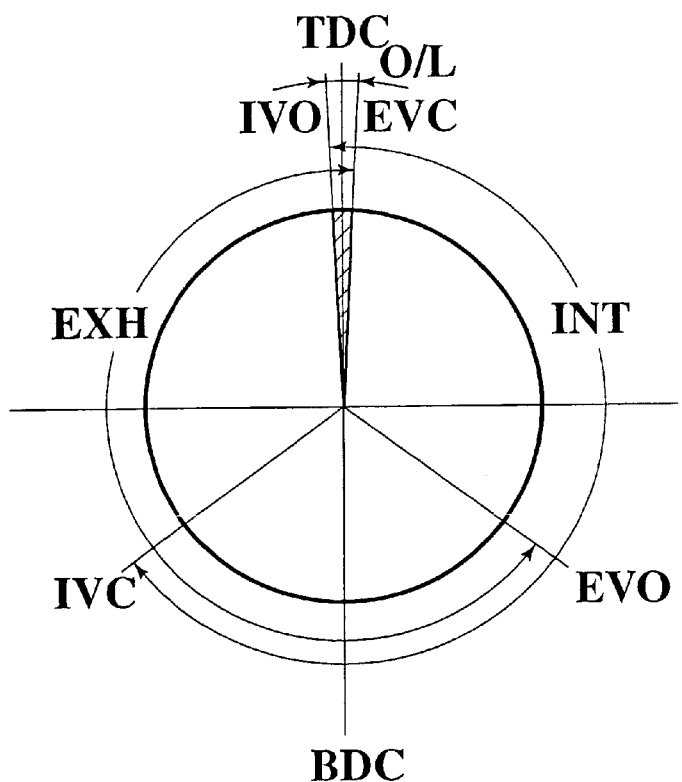
FIG. 4A is a diagram showing setting of the valve timing when a high load is put on the four-cycle internal combustion engine according to the embodiment.

In the present embodiment, the valve timing when the high load is put on the engine E is set as shown in FIG. 4A.

Namely, the valve timing at the time of the high load is set in a similar manner to that of a normal four-cycle gasoline engine. More specifically, valve closing time EVC of the exhaust valve 8 and valve opening time IVO of the inlet valve 6 are set around a piston top dead center TDC, and a predetermined valve overlap angle O/L is set. More concretely, the valve closing time EVC of the exhaust valve 8 is within a range of about 5 to 100 after the top dead center ATDC, and the valve opening time IVO of the inlet valve 6 is within a range of 5 to 10° before the top dead center BTDC. Thus the valve overlap angle O/L is within a range of about 10 to 20°. Moreover, the valve opening time EVO of the exhaust valve 8 is about 55 before bottom dead center BBDC with respect to a piston bottom dead center BDC, and the valve closing time IVC of the inlet valve 6 is about 50° after the piston bottom dead center ABDC. Incidentally, in the drawing, the exhaust process is represented by EXH, and the intake process is represented by INT.

Figure 4B:
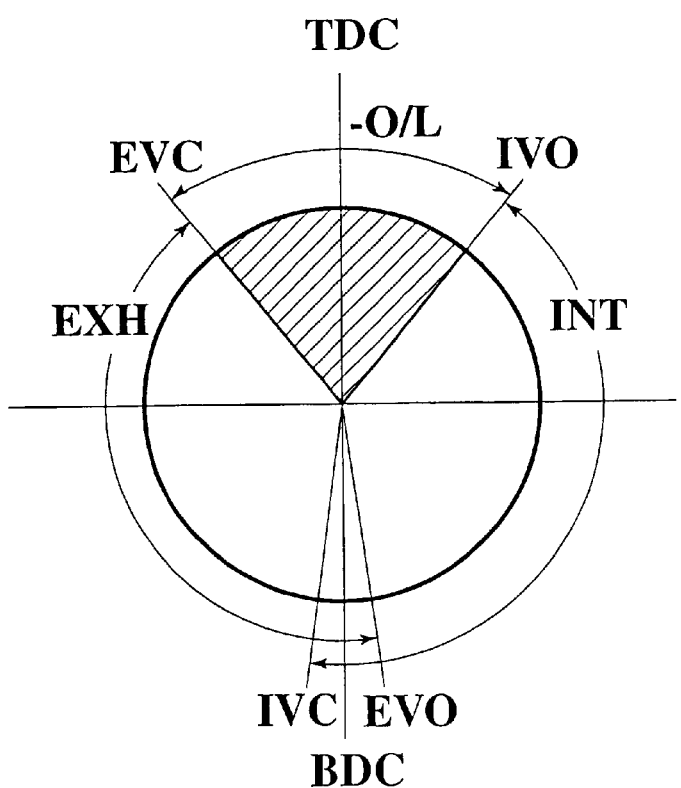
FIG. 4B is a diagram showing the setting of the valve timing when a low load is put on the four-cycle internal combustion engine according to the embodiment.

Meanwhile, the valve timing at the time of low load on the engine E in the present embodiment is set as shown in FIG. 4B.

Namely, as for the valve timing when the low load is put on the engine E, when It is compared with the case of the high load, the valve closing time EVC of the exhaust valve 8 advances, and the valve opening time EVO of the exhaust valve 8 delays so that the valve timing is closer to the piston bottom dead center BDC. More concretely, the valve closing time EVC of the exhaust valve 8 is set within a range of 60 to 80° before the top dead center BTDC, and the valve opening time EVO is set to about 10° before the bottom dead center BBDC. Here, the valve opening time EVO can be set within a range of about 10° before the bottom dead center BBDC to about 55° before the bottom dead center BBDC similarly to the time of high load. Moreover, the valve opening time IVO of the inlet valve 6 is set to be delayed so that an angle between the piston top dead center TDC and the valve opening time IVO of the inlet valve 6 becomes substantially equal with an angle between the valve closing time EVC of the exhaust valve 8 and the piston top dead center TDC. Namely, the valve opening time IVO of the inlet valve 6 is set within the range of 60 to 80° after the top dead center ATDC correspondingly to the valve closing time EVC of the exhaust valve 8, and the valve closing time IVC of the inlet valve 6 is set to about 10° after the bottom dead center ABDC. Here, the valve closing time IVC can be set within a range of about 10° after the bottom dead center ABDC to about 40° after the bottom dead center ABDC. In the other words, the valve timing when low load is put on the engine E is set so that the valve overlap angle O/L around the piston top dead center TDC obtains a negative value which is different from a value obtained at the time of high load so as to become a so-called minus overlap angle (−O/L).

Needless to say, the adjustable valve mechanisms 10A and 10B according to the present embodiment can switch the valve timing at the time of the high load and low load, and also can sequentially change the valve timing according to the load. As a result, particularly even at the time of the low load, according to the load, the valve timing corresponding to the above-mentioned ranges can be sequentially changed.

In addition, on principle, with respect to the valve opening time IVO of the inlet valve 6 and the valve closing time EVC of the exhaust valve 8, it is sufficient when low load is put on the engine E at least to advance the valve opening time IVO of the inlet valve 6 or delay the valve closing time EVC of the exhaust valve 8 compared with the case where high load is put on the engine E.

Figure 5:
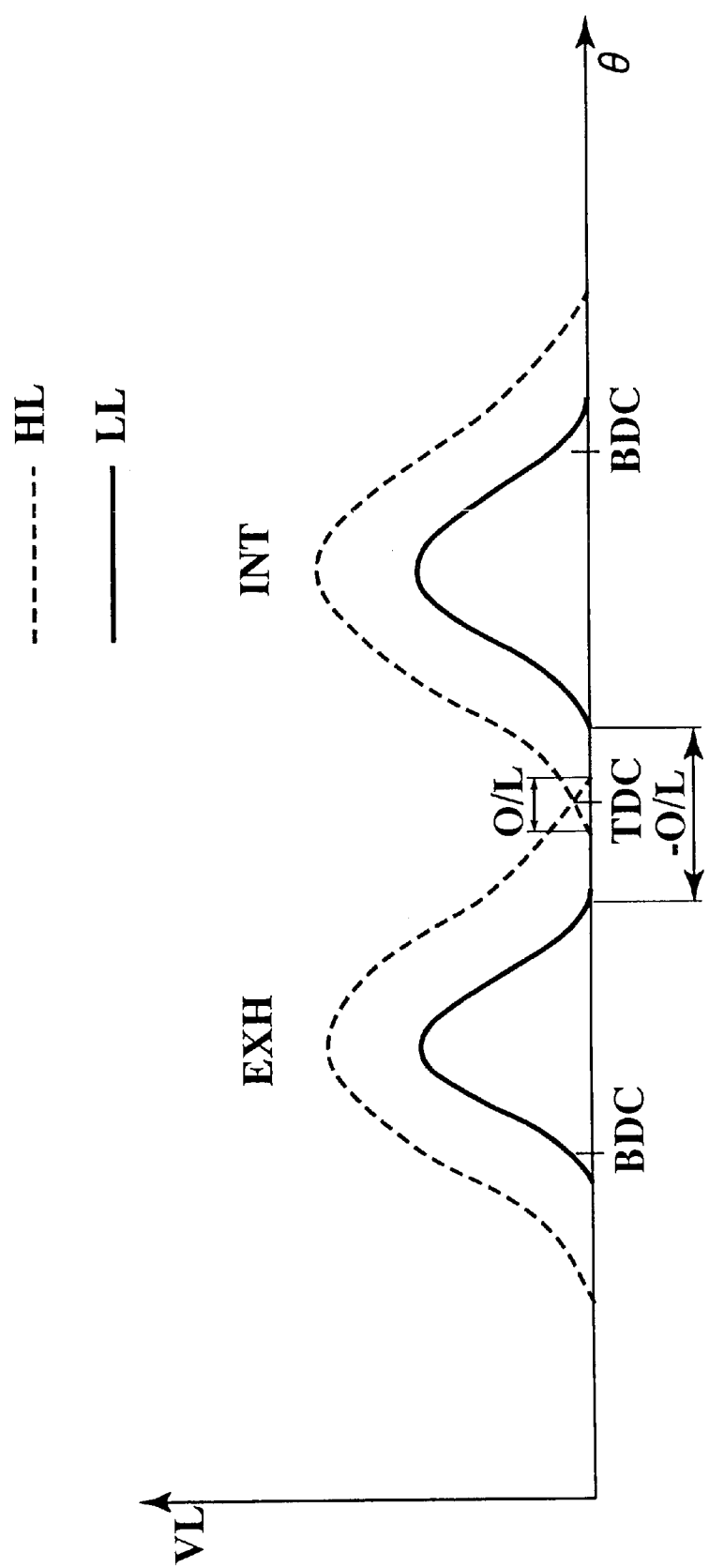
FIG. 5 is a diagram showing a relationship between the valve timing shown in FIG. 4 and a crank angle.

For more clear understanding, in FIG. 5, the valve timing when the high load and low load are put on the engine E in the present embodiment is represented as a lift curve which shows a change in a valve lift quantity VL of the inlet and exhaust valves 6 and 8 with respect to the change in the crank angle θ. In the drawing, a broken line curve is a lift curve at the time of the high load HL and a solid line curve is a lift curve at the time of the low load LL.

Further, for more clear understanding, FIGS. 6A through 6F show a gas exchange process in the combustion chamber 4 at the valve timing when the low load is put on the engine E in the present embodiment.

Figure 6A:
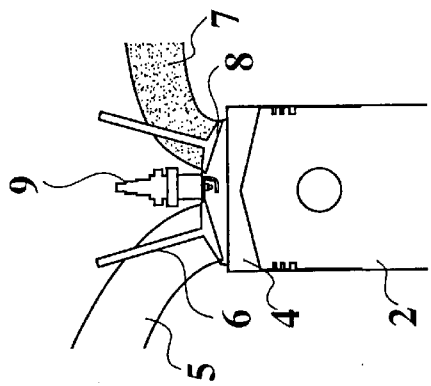
FIGS. 6A through 6F are diagrams showing a gas exchange process in a combustion chamber when the low load is put on the four-cycle internal combustion engine according to the embodiment.

At first, FIG. 6A shows a state in the middle of the exhaust process. The piston 2 is risen halfway, and a burned gas is exhausted from the opened exhaust valve 8 to the exhaust port 7.

Figure 6B:
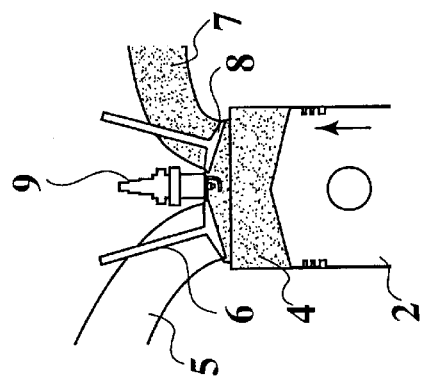

Next, FIG. 6B shows a state that the piston 2 is risen halfway, and the timing is still in the middle of the exhaust process at the time of high load, but the exhaust valve 8 reaches the valve closing time EVC so as to be closed. The burned gas which remains in the combustion chamber 4 at this time is shut up in the combustion chamber 4, and the residual burned gas becomes a heat source of combustion in next cycle.

Figure 6C:
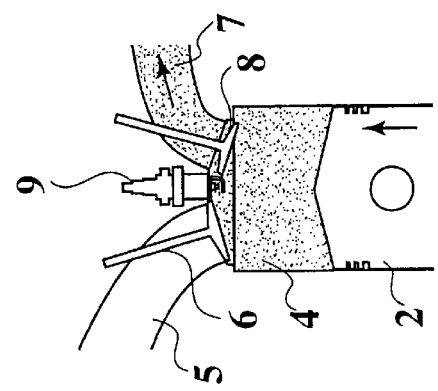

Next, FIG. 6C shows a state that the piston 2 reaches the piston top dead center TDC. The burned remaining gas which is shut up in the combustion chamber 4 is compressed until such a state is obtained.

Figure 6D:
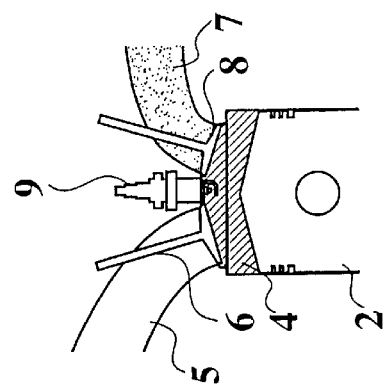

Next, FIG. 6D shows a state that the piston 2 is lowered after it reaches the piston top dead center TDC.

Figure 6E:
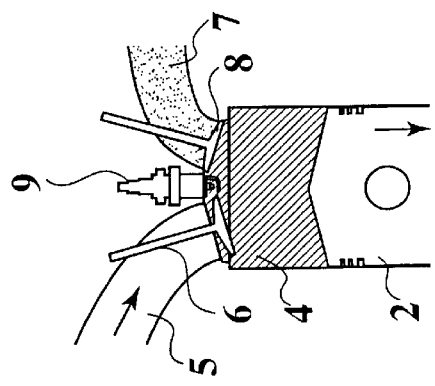

Next, FIG. 6E shows a state that the piston 2 is further lowered so that the inlet valve 6 reaches the valve opening time IVO, and the exhaust valve 8 is still closed. When the inlet valve 6 is opened, a new gas is sucked from the inlet port 5 so as to be agitated and mixed with the residual burned gas.

Here, since the valve opening time IVO of the inlet valve 6 is delayed, when the speed of the piston 2 is comparatively high, the intake is started. Therefore, since the intake speed of the new gas becomes high, the new gas is mixed with the residual burned gas sufficiently and uniformly at such a valve timing, and the thermal efficiency can be improved and an exhaust quantity of NOx can be reduced.

Needless to say, as shown by a hypothetical line in FIG. 1, a partial shielding valve 16 for shielding a part of the inlet port 5 is provided, and the partial shielding valve 16 is closed at the time of the low load. As a result, a intake gas flow rate of the new gas is increased, and thus the new gas may be mixed with the residual burned gas more positively.

In addition, since the work required in the compression process of the residual burned gas is recovered in such a manner that the residual burned gas is expanded until the inlet valve 6 is opened and the piston 2 is pushed down, the thermal efficiency is improved.

Figure 6F:
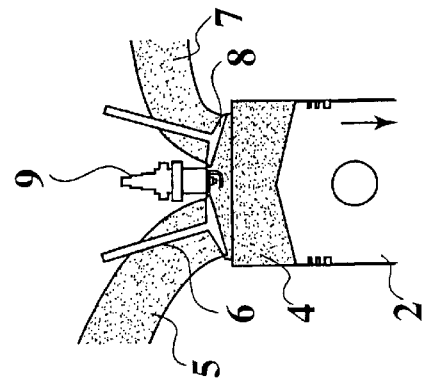

Thereafter, as shown in FIG. 6F, a fuel-air mixture, which is obtained by uniformly mixing the residual burned gas of high temperature with the new gas, is compressed according to the lift of the piston 2 so as to be self-ignited and burned around the piston top dead center TDC.

Figure 7A:
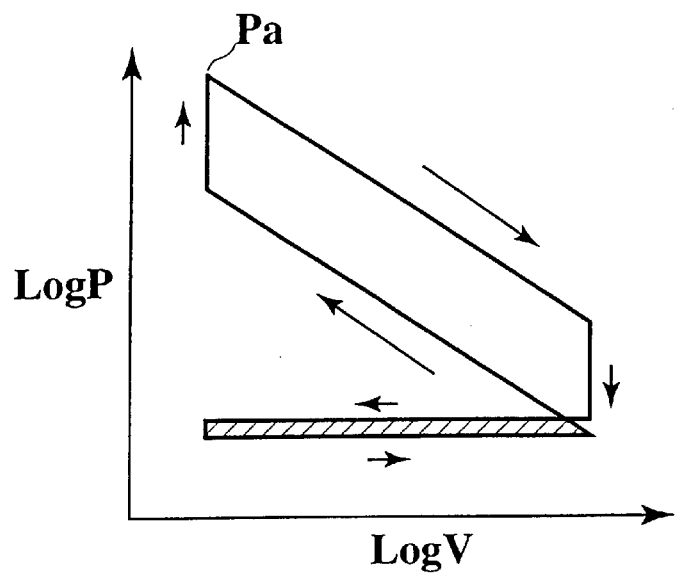
FIG. 7A is a P-V chart showing a change in pressure in the combustion chamber at the time of the high load according to the embodiment.
Figure 7B:
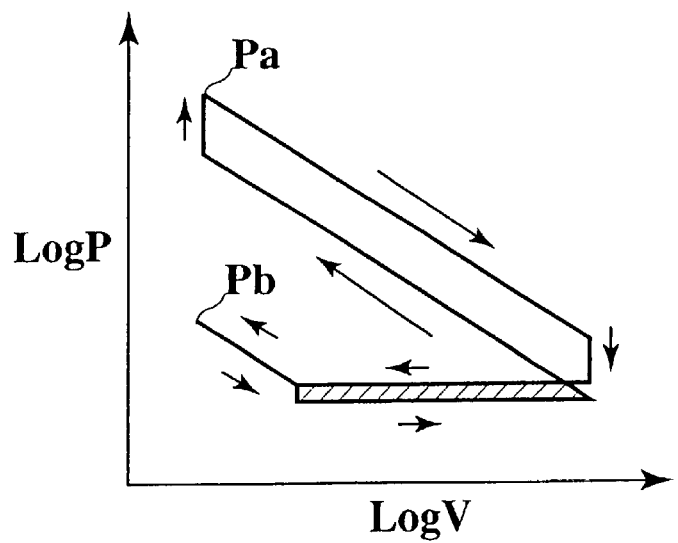
FIG. 7B is a P-V chart showing a change in pressure in the combustion chamber at the time of the low load according to the embodiment.

For more clear understanding, FIGS. 7A and 7B show simplified P-V charts in the combustion chamber 4. More concretely, FIG. 7A shows the simplified P-V chart in the combustion chamber 4 when the high load is put on the engine E, and FIG. 7B shows the simplified P-V chart in the combustion chamber 4 when the low load is put on the engine E. In the drawings, an arrow corresponds to a change in the operating process of the engine E.

As understood from comparison between FIG. 7A and FIG. 7B, in the P-V chart of FIG. 7A when the high load is put on the engine E, a pressure peak Pa is obtained at a compression top dead center between the compression process and the expansion process, and in the P-V chart of FIG. 7B when the low load is put on the engine E, a pressure peak Pa is obtained at the compression top dead center between the compression process and the expansion process and also a pressure peak Pb is obtained at the piston top dead center between the exhaust process and the intake process. However, at the time of low load, a comparatively large quantity of the residual burned gas exists due to the valve timing which forms the minus overlap angle (−O/L). Therefore, a portion, which corresponds to a pump loss in the operating process of the engine E represented by a slanted line portion in each of FIGS. 7A and 7B, becomes smaller at the time of the low load in FIG. 7B, and thus it can be understood that the thermal efficiency is improved.

In short, in the present embodiment, when the valve timing when the low load is put on the engine E is set as shown in FIGS. 4B and 5, the engine E goes through the operating process typically shown in FIGS. 6A through 6F. As a result, the uniform fuel-air mixture is obtained by mixing the residual burned gas of high temperature with the new gas, and it is compressed according to the rise of the piston so as to be self-ignited and burned. As a result, the extremely lean combustion becomes possible, and thus the thermal efficiency is improved. Further, the uniform self-ignition combustion eliminates a partial high-temperature portion, and thus the exhaust of NOx is suppressed to an extremely small quantity.

Here, the valve timing of the engine E by means of the adjustable valve mechanisms 10A and 10B will be further investigated in detail.

For example, according to a change in the load from the high load to the low load, even if the valve timing is switched so that a predetermined minus overlap angle (−O/L) is simply formed at the time of the low load, namely even if the single valve timing is set, when the fuel-air mixture is enriched gradually in the lean area, the compression ignition surely occurs and the gas is burned, but there is a so-called rich limitation such that the knocking occurs after all. On the contrary, when the fuel-air mixture is gradually lean in the lean area, the residual burned gas of high temperature is surely utilized, but there is a so-called lean limitation such that the combustion becomes unstable after all. Therefore, in the compression self-ignited combustion, a load range where the high thermal efficiency and low NOx exhaust can be realized is substantially restricted.

Consequently, in the present embodiment, when the low load Is put on the engine E, the valve timing is changed sequentially according to the load.

Figure 8:
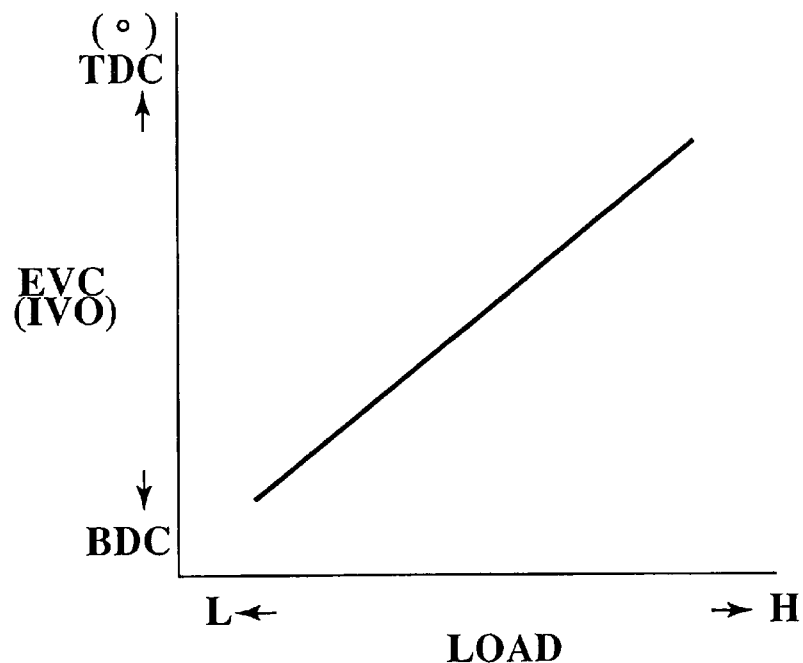
FIG. 8 is a diagram showing characteristic of close time of an exhaust valve and that of open time of a inlet valve at the time of a low load according to the embodiment.

More specifically, as typically shown in FIG. 8, on a low load side L in a low-load range of the engine E, namely, in a pulse width range of 2 to 5 (ms) of the driving signal to the injector corresponding to the basic fuel injection quantity TP, the valve closing time EVC of the exhaust valve 8 is advanced from the piston top dead center TDC in proportion to a decrease in the pulse width, and the valve opening time IVO of the inlet valve 6 is delayed from the piston top dead center TDC in proportion to the decrease in the pulse width. On the contrary, on a high-load side H in the low-load range of the engine E, an advance degree of the valve closing time EVC of the exhaust valve 8 is made to be small in proportion to an increase in the pulse width, and a delaying degree of the valve opening time IVO of the inlet valve 6 is made to be small in proportion to the increase in the pulse width. Namely, in the present embodiment, in the low-load range of the engine E, the advance degree of the valve closing time EVC of the exhaust valve 8 from the piston top dead center TDC is decreased linearly from the low load side L towards the high load side H, and the delay degree of the valve opening time IVO of the inlet valve 6 from the piston top dead center TDC is decreased linearly from the low load side L towards the high load side H.

Due to the above setting, since a quantity of the residual burned gas of high temperature is increased on the low load side L in the low load area of the engine E, the sufficient compression-ignited combustion is maintained for the more lean fuel-air mixture, and since a quantity of the residual burned gas of high temperature is decreased on the high load side H, the generation of the knocking is suppressed.

Further, in the present embodiment, since the change in the valve timing is given to the valve closing time EVC of the exhaust valve 8 and the valve opening time IVO of the inlet valve 6 equivalently, the work, which is required for compressing the residual burned gas in the combustion chamber 4 in the process from the valve closing time EVC of the exhaust valve 8 to the piston top dead center TDC, can be recovered securely by the process from the piston top dead center TDC to the valve opening time IVO of the inlet valve 6 so that the thermal efficiency can be further improved. Here, in the engine E which does not use a supercharger, if a cylinder pressure at the time of the valve closing time EVC of the exhaust valve 8 is about 1 (atm) which is substantially equal with a port pressure of the inlet port 5, the cylinder pressure at the valve opening time IVO of the inlet valve 6 is about 1 (atm).

Furthermore, by advancing the valve closing time IVC of the inlet valve 6. an effective compression ratio from the valve closing time IVC of the inlet valve 6 to the piston top dead center TDC becomes large, and the temperature and pressure of the fuel-air mixture at the piston top dead center TDC become higher so that the compression ignition becomes easy. And by delaying the valve opening time EVO of the exhaust valve 8, an effective expansion ratio from the piston top dead center TDC to the valve opening time EVO of the exhaust valve 8 becomes large so that a power can be taken out efficiently from the working gas which has such a high temperature due to the ignition.

Here, the valve timing characteristic when the low load is put on the engine E typically shown in FIG. 8 is previously stored as a map in a memory in the ECU 11. Moreover, the characteristic can be variously set as the need arises in such a manner that its inclination is adjusted or a non-linear one is adopted.

There will be described below the control of the valve timing of the engine E according to the present embodiment with reference to the flow chart shown in FIG. 9.

Figure 9:
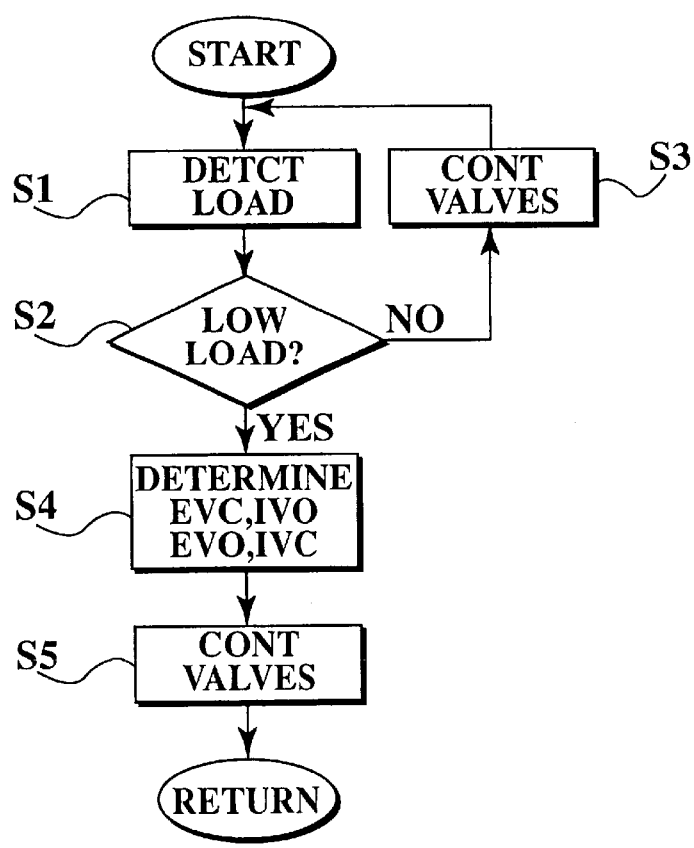
FIG. 9 is a flow chart for controlling the valve timing of the four-cycle internal combustion engine according to the embodiment.

At first, in FIG. 9, a process for controlling the valve timing is started by the ECU 11 when an ignition is turned ON.

Load of the engine E is detected at step 1 (S1). In the present embodiment, the load of the engine E is detected by obtaining the pulse width of the pulse driving signal to be sent to the injector correspondingly to the basic fuel injection quantity TP. Here, the basic fuel injection quantity TP is calculated by the ECU 11 based on the engine speed inputted from the crank angle sensor 12a and the intake air quantity inputted from the airflow meter 12d, and the pulse width of the pulse driving signal to be transmitted to the injector is obtained from a table corresponding to the basic fuel injection quantity TP previously stored in the memory in the ECU 11.

Next, a judgment is made at step 2 (S2) as to whether or not the load of the engine E is in the low-load area. More concretely, when the pulse width of the pulse driving signal to be transmitted to the injector correspondingly to the basic fuel injection quantity TP is within a range of 2 to 5 (ms), the load is in the low-load area, and when the pulse width exceeds 5 (ms), the load is not in the low-load area. Here, when the judgment is made that the load of the engine E is not in the low-load area, namely the high load is put on the engine E, the process goes to step 3 (S3) so that the adjustable valve mechanisms 10A and 10B are controlled to realize the valve timing similar to ordinary one as shown in FIG. 4A, and the valve timing of the inlet valve 6 and the exhaust valve 8 is correspondingly controlled. Then a new gas is sucked and compressed to be spark ignited by the ignition plug 9 and burned by flame propagation. After the step 3 (S3) is completed, the process returns to the step 1 (S1).

Meanwhile, when the judgment is made that the engine E is in the low-load area at the step 3 (S2), the process goes to step 4 (S4).

At the step 4 (S4), the valve closing time EVC of the exhaust valve 8, the valve opening time IVO of the inlet valve 6, the valve opening time EVO of the exhaust valve 8 and the valve closing time IVC of the inlet valve 6 are determined. More concretely, the valve closing time EVC of the exhaust valve 8 and the valve opening time IVO of the inlet valve 6 are determined from the map as shown in FIG. 8 previously stored in the memory of the ECU 11 correspondingly to the load of the engine E. That is, the valve closing time EVC of the exhaust valve 8 is determined within a range of 60 to 80° before the top dead center BTDC according to the load, and the valve opening time IVO of the inlet valve 6 is determined in the range of 60 to 80° after the top dead center ATDC correspondingly to the valve opening time EVO of the exhaust valve 8 according to the load. Moreover, considering conditions such that the effective compression ratio can be large and the compression self-ignition becomes easy and the like, the valve opening time EVO of the exhaust valve 8 and the valve closing time IVC of the inlet valve 6 are determined by using the values previously stored in the memory of the ECU 11. Namely, the valve opening time EVO of the exhaust valve 8 is determined as 10° before the bottom dead center BBDC, and the valve closing time IVC of the inlet valve 6 is determined as 10° after the bottom dead center ABDC.

Next, at step 5 (S5), the adjustable valve mechanisms 10A and 10B are controlled based on the valve closing time EVC of the exhaust valve 8, the valve opening time IVO of the inlet valve 6, the valve opening time EVO of the exhaust valve 8 and the valve closing time IVC of the inlet valve 6 determined at the step 4 (S4) so that the valve timing of the inlet valve 6 and the exhaust valve 8 is controlled.

After the step 5 (S5) is completed, a series of the above process is ended, another series of the process is started again from the step 1 (S1) after a predetermined interval, and the process is repeated similarly until the ignition is turned OFF.

Finally, there will be detailed below various experimental results made by the inventors based on the above structure.

Figure 10:
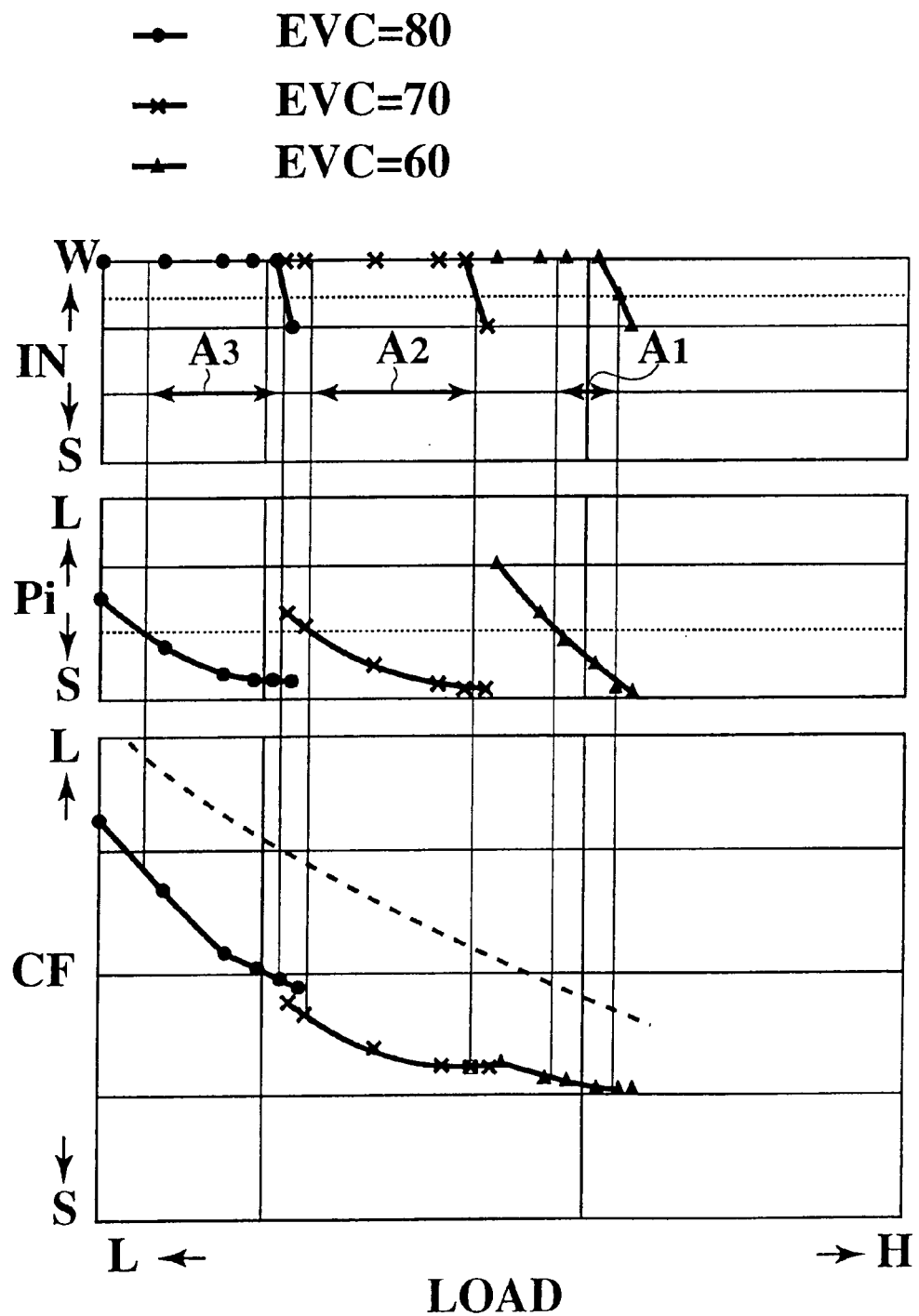
FIG. 10 is a diagram showing experimental results of compression ignition as to the valve timing according to the embodiment.

FIG. 10 shows results, which are obtained by measuring a knock intensity IN of the engine E(S means strong and W means weak), a combustion varying rate Pi of the engine E (L means large and S means small) and a fuel consumption rate CF of the engine E (L means large and S means small), with respect to the load of the engine E (L means low and H means high) when the advance control range of the valve closing time EVC of the exhaust valve 8 are respectively set to 60°, 70° and 80° before the top dead center BTDC. Here, the knock intensity IN, combustion varying rate Pi and fuel consumption rate CF are successively shown in the order from the top to the bottom of FIG. 10.

As is clearly shown in FIG. 10. it can be understood that the ranges, where the operability of the engine E is the most satisfactory as to the knock intensity IN and the combustion varying rate Pi whose threshold values are respectively represented by a dotted line, exist as represented by the ranges $A_1$, $A_2$ and $A_3$ at the respective valve closing time EVC of 60°, 70° and 80° when the low load is put on the engine E. Further, it can be also understood that the fuel consumption rate CF is reduced greatly in the ranges $A_1$ through $A_3$ compared with the conventional one represented by the curved dotted line.

Therefore, when the valve closing time EVC of the exhaust valve 8 is controlled sequentially according to the load of the engine E within the range of 60° to 80° before the top dead center BTDC which is the advance control range of the valve closing time EVC, the residual burned gas can be controlled suitably, namely the temperature of the fuel-air mixture can be controlled so that the compression-ignited combustion can be realized by uniform premixing. Thus it can be understood that the premixed compression-ignited combustion can be realized in the wide load range of the engine E in the present embodiment.

In the present embodiment, when the low load is put on the engine E, the advance of the valve closing time EVC of the exhaust valve 8 is sequentially and variably controlled according to load, but needless to say, it may be controlled in multiple stages in accordance with a step-like function.

Figure 11:
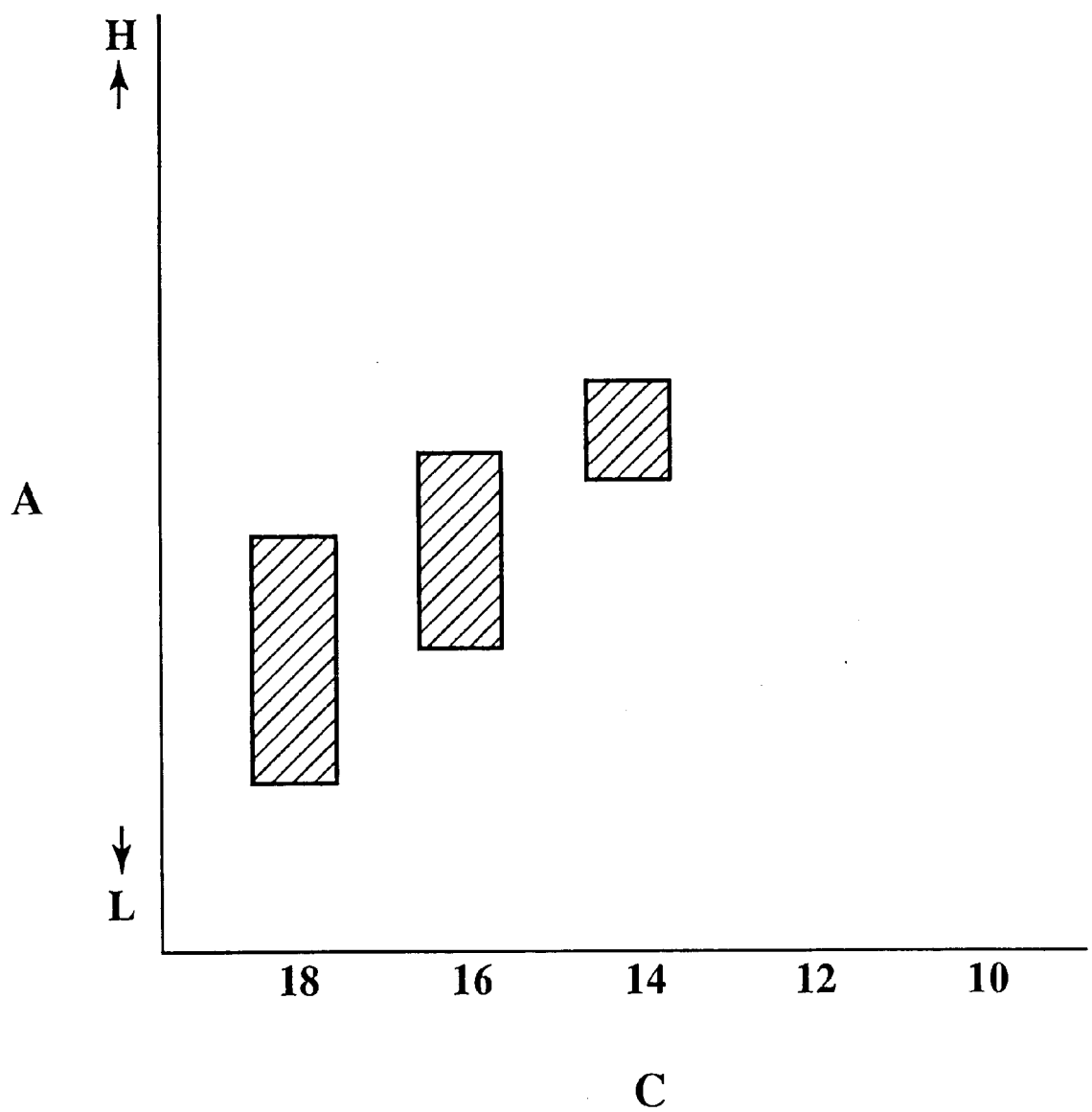
FIG. 11 is a diagram showing a load range corresponding to the compression ratio where suitable operation is possible according to the embodiment.

Next, FIG. 11 shows results, which are obtained by setting the compression ratio C of the engine E to 14, 16 and 18 and measuring a range A where the engine E can be operated suitably at the time of low load according to the load of the engine E, represented by slanted line portions.

As described with reference to FIG. 10, it is found that when the advance range of the valve closing time EVC of the exhaust valve 8 at the time of putting the low load on the engine E is set preferably, namely set within the range of 60° to 80° before the top dead center BTDC so that the valve timing is preferably controlled, the premixed compression-ignited combustion can be realized in the wide load range of the engine E. Meanwhile, as clearly understood from FIG. 11, when the compression ratio C of the engine E is within a range of 14 to 18, the premixed compression-ignited combustion can be realized in the wide load range of the engine E similarly.

More specifically, when the compression ratio C of the engine E is smaller than 14, the combustion varying rate becomes large at the time of the low load, and stability of the combustion is deteriorated so that the torque and power of the engine E are deteriorated and its operability becomes unsuitable. Meanwhile, when the compression ratio C of the engine E is larger than 18, a knock occurs remarkably at the time of the high load so that its operability becomes unsuitable.

Therefore, when the compression ratio C of the engine E is controlled sequentially according to the load of the engine E within the range of 14 to 18, the residual burned gas can be controlled suitably so that the satisfactory premixed compression-ignited combustion can be realized in the wide load range of the engine E.

In the present embodiment, the compression ratio is controlled variably and sequentially according to the load when the low load is put on the engine E, but needless to say it may be controlled suitably in multiple stages in accordance with a step-like function as same as the valve timing.

Further, the above results do not substantially depend on the type of the fuel injection, the shape of the combustion chamber and the like, and thus similar results can be obtained regardless of them. Needless to say, a number of cylinders, cam shafts and valves is not limited with respect to the structure of the present embodiment.

The entire contents of a Patent Application No. TOKUGANHEI 10-235730, with a filing date of Aug. 21, 1998 in Japan, are hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A four-cycle internal combustion engine comprising:
   a combustion chamber;
   an igniter igniting a fuel-air mixture in said combustion chamber;
   a piston changing a capacity of said combustion chamber;
   an inlet valve opening/closing said combustion chamber;
   an exhaust valve opening/closing said combustion chamber;
   an adjustable valve mechanism switching valve timing of said inlet valve and switching that of said exhaust valve; and
   a controller controlling said igniter and said adjustable valve mechanism,
   wherein when a high load is put on said four-cycle internal combustion engine, said controller sets said valve timing of said exhaust valve in said adjustable valve mechanism so that said exhaust valve is closed around a top dead center of said piston, and ignites said fuel-air mixture around a compression top dead center of said piston by using said igniter, and wherein when a low load is put on said four-cycle internal combustion engine, said controller sets said valve timing of said exhaust valve in said adjustable valve mechanism so that valve closing timing of said exhaust valve advances before said top dead center of said piston as a load put on said four-cycle internal combustion engine becomes lower, and compression-ignites said fuel-air mixture without using said igniter.

2. A four-cycle internal combustion engine according to claim 1, wherein when said high load is put on said four-cycle internal combustion engine, said controller sets said valve timing of said inlet valve in said adjustable valve mechanism so that said inlet valve is opened around said top dead center of said piston, and wherein when said low load is put on said four-cycle internal combustion engine, said controller sets said valve timing of said inlet valve in said adjustable valve mechanism so that said inlet valve is opened after the top dead center of said piston.

3. A four-cycle internal combustion engine according to claim 1, wherein when said high load is put on said four-cycle internal combustion engine, said controller sets said valve timing of said inlet valve in said adjustable valve mechanism so that said inlet valve is opened around said top dead center of said piston, and wherein when said low load is put on said four-cycle internal combustion engine, said controller sets said valve timing of said inlet valve in said adjustable valve mechanism so that valve opening time of said inlet valve is delayed after said top dead center of said piston as said load put on said four-cycle internal combustion engine becomes lower.

4. A four-cycle internal combustion engine according to claim 1, wherein when said low load is put on said four-cycle internal combustion engine, valve opening time of said inlet valve corresponds to time when a pressure in said combustion chamber becomes substantially equal to that in an inlet port.

5. A four-cycle internal combustion engine according to claim 1, wherein when said low load is put on said four-cycle internal combustion engine, valve closing time of said exhaust valve is within a range of 60 to 80° before said top dead center of said piston.

6. A four-cycle internal combustion engine according to claim 1, wherein when said low load is put on said four-cycle internal combustion engine, said controller delays valve opening time of said inlet valve compared with a case where said high load is put on said four-cycle internal combustion engine.

7. A four-cycle internal combustion engine according to claim 1, wherein when said low load is put on said four-cycle internal combustion, said controller advances valve closing time of said exhaust valve compared with a case where said high load is put on said four-cycle internal combustion engine.

8. A four-cycle internal combustion engine according to claim 1, wherein when said low load is put on said four-cycle internal combustion engine, said controller delays valve opening time of said inlet valve and advances valve closing time of said exhaust valve compared with a case where said high load is put on said four-cycle internal combustion engine.

9. A four-cycle internal combustion engine according to claim 1, wherein when said low load is put on said four-cycle internal combustion engine, said controller variably and sequentially controls said valve timing according to a load put on said four-cycle internal combustion engine.

10. A four-cycle internal combustion engine according to claim 1, wherein a compression ratio of said four-cycle internal combustion engine is within a range of 14 to 18.

11. A four-cycle internal combustion engine according to claim 1, further comprising a shielding valve provided in an inlet port of said four-cycle internal combustion engine so as to partially shield said inlet port when said low load is put on said four-cycle internal combustion engine.

12. A four-cycle internal combustion engine comprising:
   a combustion chamber;
   an igniter igniting a fuel-air mixture of said combustion chamber;
   a piston changing capacity of said combustion chamber;
   an inlet valve opening/closing said combustion chamber;
   an exhaust valve opening/closing said combustion chamber;
   an adjustable valve means for switching valve timing of said inlet valve and switching that of said exhaust valve; and
   a controlling means for controlling said igniter and said adjustable valve means,
   wherein when a low load is put on said four-cycle internal combustion engine, said controlling means sets said valve timing of said exhaust valve in said adjustable valve means so that valve closing timing of said exhaust valve advances before a top dead center of said piston; and
   wherein an advance degree of said valve closing time of said exhaust valve is larger as a load put on said four-cycle internal combustion engine is lower.

13. A control method of controlling valve timing of a four-cycle internal combustion engine comprising:
   detecting a load put on said four-cycle internal combustion engine;
   judging as to whether or not said load put on said four-cycle internal combustion engine is low; and
   setting valve timing of an exhaust valve of said four-cycle internal combustion engine so that valve closing time of said exhaust valve advances before a top dead center of a piston of said four-cycle internal combustion engine, if judgment is made that said load put on said four-cycle internal combustion engine is low; and
   wherein an advance degree of said valve closing time of said exhaust valve is larger as said load put on said four-cycle internal combustion engine is lower.

* * * * *